United States Patent
Elie

(10) Patent No.: US 11,415,421 B2
(45) Date of Patent: Aug. 16, 2022

(54) DEVICE AND METHOD FOR INERTIAL/VIDEO HYBRIDIZATION

(71) Applicant: SAFRAN ELECTRONICS & DEFENSE, Boulogne-Billancourt (FR)

(72) Inventor: Philippe Elie, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/413,265

(22) PCT Filed: Dec. 12, 2019

(86) PCT No.: PCT/FR2019/053047
§ 371 (c)(1),
(2) Date: Jun. 11, 2021

(87) PCT Pub. No.: WO2020/120914
PCT Pub. Date: Jun. 18, 2020

(65) Prior Publication Data
US 2022/0074748 A1   Mar. 10, 2022

(30) Foreign Application Priority Data

Dec. 12, 2018 (FR) ..................................... 1872762

(51) Int. Cl.
*G01C 21/16* (2006.01)
*G06T 7/73* (2017.01)
*G06T 7/80* (2017.01)

(52) U.S. Cl.
CPC ............ *G01C 21/1656* (2020.08); *G06T 7/73* (2017.01); *G06T 7/80* (2017.01); *G06T 2207/10032* (2013.01); *G06T 2207/30252* (2013.01)

(58) Field of Classification Search
USPC ......................................................... 701/501
See application file for complete search history.

(56) References Cited

U.S. PATENT DOCUMENTS

| 6,912,464 B1 * | 6/2005 | Parker .................. G01C 21/165 701/501 |
| 2005/0237385 A1 * | 10/2005 | Kosaka .................. G01C 11/02 348/42 |

(Continued)

FOREIGN PATENT DOCUMENTS

| EP | 0 691 599 A2 | 1/1996 | |
| FR | 3 090 170 B1 | 11/2020 | |
| WO | WO-2020120914 A1 * | 6/2020 | ............... G06T 7/80 |

OTHER PUBLICATIONS

International Search Report and Written Opinion of the International Searching Authority for International Application No. PCT/FR2019/053047, dated Mar. 5, 2020, with English translation of the Search Report.

*Primary Examiner* — Tyler D Paige
(74) *Attorney, Agent, or Firm* — Birch, Stewart, Kolasch & Birch, LLP

(57) ABSTRACT

The invention relates to an inertial/video hybridisation device (2) intended to be mounted on a carrier (2), the device comprising: a camera (6) configured to acquire a first image showing a predetermined landmark (12) attached to the carrier (2), a processing unit (8) configured to estimate a velocity of the carrier (2) from the acquired first image, with a view to hybridising the estimated velocity with inertial data relating to the carrier (2) produced by an inertial unit (4), locating a position of the landmark (12) in the first acquired image, calculating a deviation between the located position and a reference position of the landmark (12), comparing the calculated deviation with a predetermined threshold, and signalling an alert when the calculated deviation is greater than the predetermined threshold.

10 Claims, 3 Drawing Sheets

(56) References Cited

U.S. PATENT DOCUMENTS

| | | | |
|---|---|---|---|
| 2006/0049333 A1* | 3/2006 | Rols | G01S 3/7864 |
| | | | 250/208.1 |
| 2008/0167814 A1* | 7/2008 | Samarasekera | G06V 10/50 |
| | | | 701/469 |
| 2016/0088287 A1* | 3/2016 | Sadi | H04N 13/261 |
| | | | 348/43 |
| 2016/0299233 A1* | 10/2016 | Levien | G01S 19/14 |
| 2017/0025024 A1* | 1/2017 | Kabrt | B64C 27/04 |
| 2018/0342082 A1 | 11/2018 | Lewis et al. | |
| 2018/0365533 A1* | 12/2018 | Sathyanarayana | G06K 9/6289 |
| 2020/0134866 A1* | 4/2020 | Kitaura | G06T 7/74 |
| 2022/0001872 A1* | 1/2022 | Taieb | G01C 21/3837 |

* cited by examiner

DEVICE AND METHOD FOR INERTIAL/VIDEO HYBRIDIZATION

FIELD OF THE INVENTION

The present invention relates to a device and an inertial/video hybridization method.

PRIOR ART

It is known to embed in a carrier such as an aircraft an inertial unit producing inertial data relative to this carrier (typically its position, its attitude, and its velocity). The inertial unit produces such data from inertial sensors such as accelerometers and gyrometers.

However, the data produced by an inertial unit drift off. This is why it has been proposed to use other types of sensors than inertial sensors, producing data for correcting the inertial data produced by the inertial unit (readjustment of the inertial data is also mentioned in the literature). Processing combining the inertial data and the data of another type is commonly called hybridization.

Different types of hybridization have been proposed. The best known is inertial/satellite hybridization (generally abbreviated as GPS/INS), which consists of combining inertial data and satellite positioning data captured by a receiver communicating with a constellation of satellites. The satellite positioning data drift off minimally, and are therefore capable of correcting the inertial data.

This type of hybridization has proven itself especially in helping with navigation of an aircraft during flight.

However, it should be remembered that GPS signals received by the receiver are highly sensitive to the presence of jammers. Today such jammers are used by many drivers so as not to be geo-located and especially in the vicinity of airport complexes. Another disadvantage of GPS signals is that their spread is hampered by the presence of buildings.

For all these reasons, an aircraft in the taxiing or landing phase is receiving noisy GPS signals to the point where GPS/INS hybridization becomes ineffectual.

Alternative hybridizations have been proposed to rectify this disadvantage. One of them is inertial/video hybridization. Inertial/video hybridization consists of determining a velocity of the carrier by means of images acquired by a camera which scans the environment of the carrier as it is moving. It is this velocity which is used to correct the inertial data.

For inertial/video hybridization to function efficaciously, the inertial unit and the camera which acquires the images must be harmonised, that is, the relative positioning of the reference in which the inertial data are expressed and the reference in which the estimated velocity from the images of the camera is expressed is known.

Deharmonization between the camera and the inertial unit can be caused by excessive shifting of the camera relative to the aircraft. This jeopardises precision of the solution for navigation resulting from inertial/video hybridization.

In the aeronautics field, it is crucial for errors to be kept within a limited tolerance range to respect safety certifications (safety), and detect when an error strays from its tolerance range.

PRESENTATION OF THE INVENTION

An aim of the invention is to detect an excessive level of deharmonization between an inertial unit and a camera of a device for inertial/video hybridization.

For this purpose, according to a first aspect of the invention, a device for inertial/video hybridization intended to be embedded on a carrier is proposed, the device comprising:
- a camera configured to acquire a first image showing a predetermined landmark fixed on the carrier,
- a processing unit configured to estimate a velocity of the carrier from the first acquired image, in order to hybridize the estimated velocity with inertial data relative to the carrier produced by an inertial unit, the device being characterised in that the processing unit is also configured to:
- locate a position of the landmark in the first acquired image,
- calculate a deviation between the located position and a reference position of the landmark,
- compare the calculated deviation to a predetermined threshold,
- convey an alert when the calculated deviation is greater than the predetermined threshold.

The device according to the first aspect of the invention can be completed by means of the following characteristics taken singly or else in combination when this is technically possible.

The reference position of the landmark can be a position of the landmark in a reference image acquired by the camera while the inertial unit and the camera are harmonised.

Alternatively, the hybridization device comprises a second camera configured to acquire a second image also showing the landmark, and the processing unit is also configured to:
- locate a second position of the predetermined landmark in the second acquired image,
- determine the reference position of the landmark by applying to the second position a predetermined transformation representative of a change of frame from the second camera to the first camera.

The processing unit is preferably configured to not hybridize the inertial data by being based on the estimated velocity, when the deviation is greater than the predetermined threshold.

Preferably, the processing unit is configured to estimate the velocity of the carrier by means of the calculated deviation so as to correct deharmonization of the camera relative to the inertial unit when the calculated deviation is not greater than the predetermined threshold, and to hybridize the velocity with the inertial data so as to produce a solution for navigation of the carrier.

Preferably, the processing unit is configured to:
- determine a level of contrast in a zone showing the landmark in the acquired image,
- calculate a deviation in contrast between the level of contrast determined in the zone and a level of reference contrast,
- compare the deviation in contrast to a predetermined contrast threshold,
- convey an alert when the deviation in contrast is greater than the predetermined contrast threshold.

A carrier such as an aircraft is also proposed, comprising a device for inertial/video hybridization according to the first aspect of the invention, and a landmark fixed on the carrier in view of the camera.

According to a third aspect of the invention, an inertial/video hybridization method is also proposed, the method comprising steps of:
- acquisition by a camera embedded on a carrier of a first image showing a predetermined landmark fixed on the carrier, estimation of a velocity of the carrier from the first acquired image, in order to hybridize the estimated velocity with inertial data relative to the carrier produced by an inertial unit, the process being characterised in that it comprises steps of:

location of a position of the landmark in the first acquired image, calculation of a deviation between the located position and a reference position of the landmark, comparison of the calculated deviation with a predetermined threshold, conveying of an alert when the calculated deviation is greater than the predetermined threshold.

The carrier is an aircraft for example. The steps of the process can be performed advantageously when the aircraft is in the taxiing or landing phase.

DESCRIPTION OF THE FIGURES

Other characteristics, aims and advantages of the invention will emerge from the following description which is purely illustrative and non-limiting and which must be considered in conjunction with the appended drawings in which.

In all figures similar elements bear identical reference numerals.

DETAILED DESCRIPTION OF THE INVENTION

Figure 1:
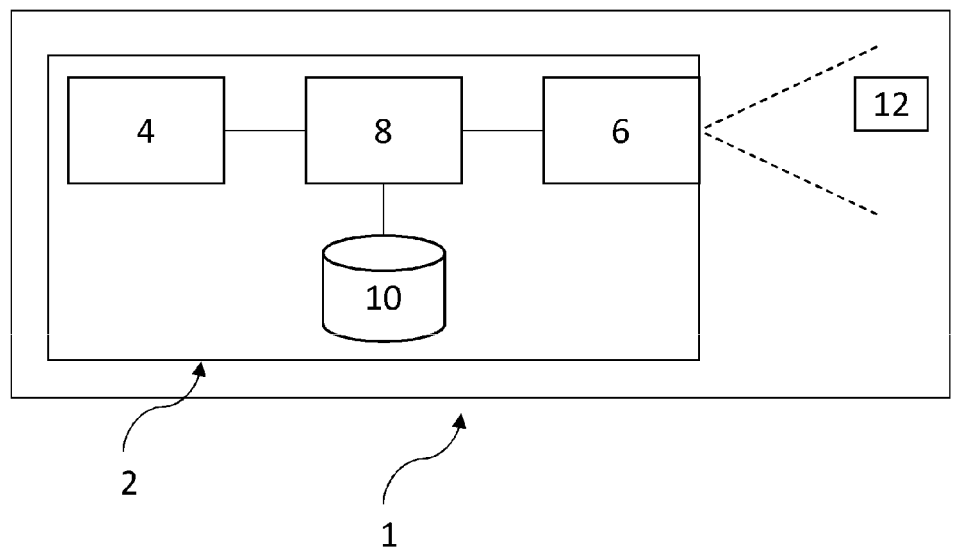
FIG. 1 FIG. 1 schematically illustrates a device for inertial/video hybridization according to a first embodiment of the invention, embedded on a carrier.

In reference to FIG. 1, a carrier 1 such as an aircraft comprises an inertial/video hybridization device 2, more simply called hybridization device 2 hereinbelow.

The hybridization device 2 comprises an inertial unit 4, a camera 6, a processing unit 8, and a memory 10.

The inertial unit 4, which is conventional, comprises a plurality of inertial sensors such as accelerometers and gyrometers. The unit is configured to produce inertial data relative to the carrier 1. These inertial data typically comprise data of position, velocity and attitude of the carrier 1. The inertial data are expressed in a first reference.

The inertial unit 4 is fixed on a wall of the carrier 1.

The camera 6 is fixed on an external surface of the carrier 1. The camera 6 is positioned to view the environment of the carrier 1. The camera 6 is also positioned so that part of the carrier 1 is in the field of vision of the camera 6. It is ensured particularly that at least one predetermined landmark 12, fixed on the carrier 1, is in view of the camera 6.

A landmark 12 is an element serving as point of reference of the camera 6. A landmark 12 can be native for example, that is, be formed by an existing element of the aircraft, such as an antenna, a pattern, a Pitot probe, etc. Alternatively, a landmark 12 is artificial in nature, that is, it is added to the aircraft to serve only as point of reference. For example, the artificial landmark 12 can take the form of a sight applied to an external surface of the aircraft.

The processing unit 8 is configured to execute classic inertial/video hybridization by means of inertial data supplied by the inertial unit 4 and data calculated from images acquired by the camera 6. It will be evident hereinbelow that the processing unit 8 is configured to execute other processing steps upstream of such hybridization, where the aim is to detect excessive deharmonization between the camera 6 and the inertial unit 4.

The processing unit 8 comprises for example at least one processor configured to execute a computer program carrying out these processing steps.

The hybridization device 2 also comprises a memory 10 configured to store data. The memory 10 especially comprises data allowing the processing unit 8 to recognise each landmark 12 in an image, by means of form recognition processing known per se.

Figure 2:
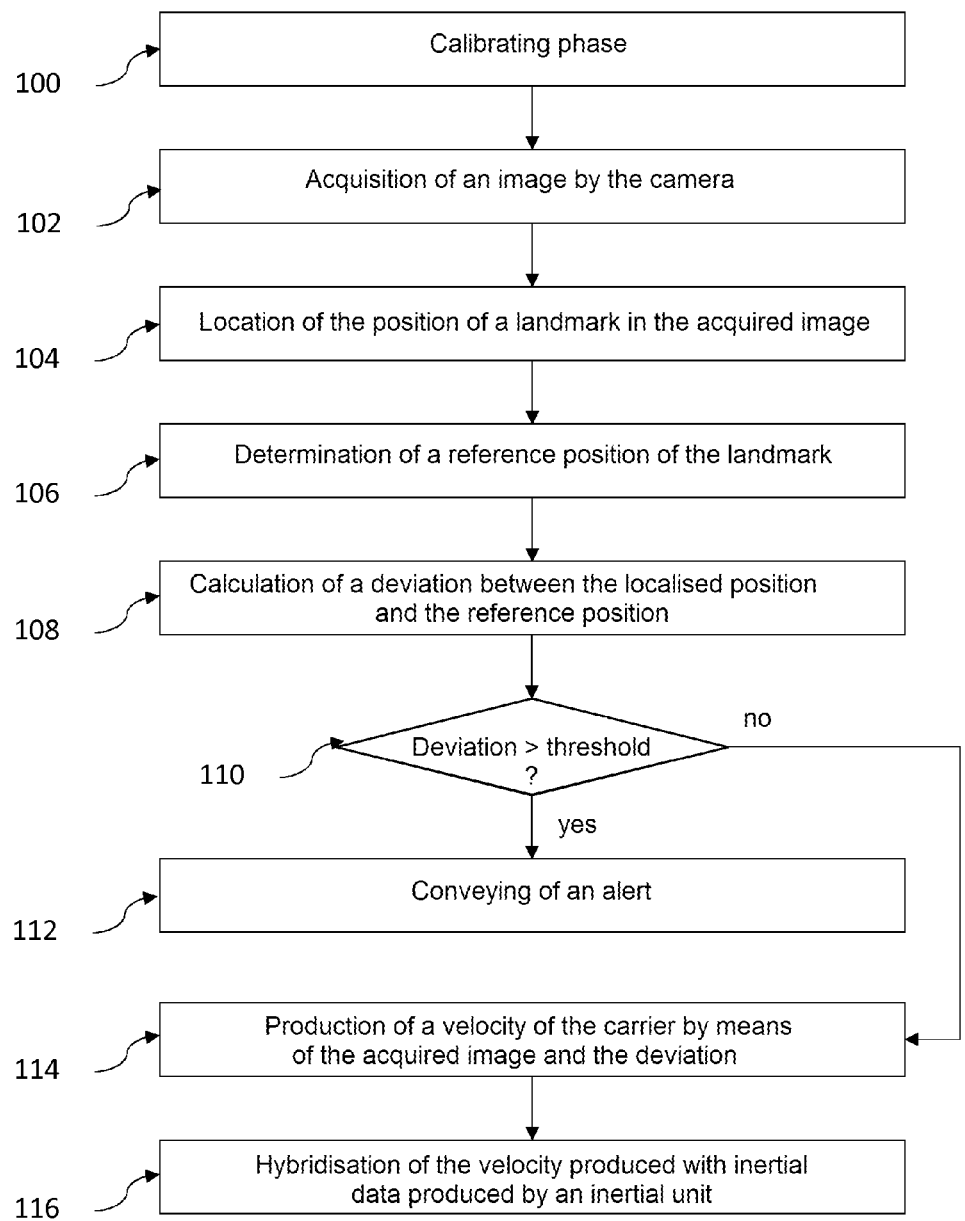
FIG. 2 FIG. 2 is a flowchart of steps of a process according to an embodiment of the invention.

In reference to FIG. 2, an inertial/video hybridization method comprises the following steps.

In a preliminary calibrating phase 100, the camera 6 is positioned in a reference position. In this position, the camera 6 and the inertial unit 4 are harmonised. The camera 6 acquires a reference image showing the or each landmark 12 fixed on the carrier 1. For at least one landmark 12, the processing unit 8 applies form recognition processing for recognising the landmark 12 in the reference image. The processing unit 8 locates in this image a position of the landmark 12, called reference. This position is typically a pixel of the image defined by a line number and a column number (i, j). The reference position of each landmark 12 is stored in the memory 10.

This preliminary calibrating phase 100 is typically performed while the carrier 1 is idle, for example during a maintenance period of the carrier 1.

In a later usage phase, the carrier 1 gets underway and the hybridization device 2 carries out the following steps.

The inertial unit 4 produces inertial data by means of its inertial sensors, in conventional manner.

At the same time, the camera 6 acquires a plurality of images, including a first image showing the environment of the carrier 1 (step 102). As indicated earlier, due to the position in which the camera 6 has been placed on the carrier 1, the first image acquired by the camera 6 also shows the or each landmark 12 used.

The processing unit 8 applies the form recognition processing which it has for recognising a landmark 12 in the first acquired image. The processing unit 8 locates the position of the recognised landmark 12 (step 104). This position is a pixel of the image defined by a line number and a column number (i', j').

Also, the processing unit 8 determines the reference position (i, j) (step 106). In the embodiment illustrated in FIG. 1, this determination step comprises simple reading of this datum previously stored in the memory 10 of the hybridization device 2.

The processing unit 8 calculates the deviation between the position of the landmark 12 in the first image and the reference position (step 108).

The processing unit 8 then compares this deviation to a predetermined threshold (step 110).

If the deviation is greater than the predetermined threshold, the processing unit 8 signals an alert (step 112). In fact, excessively high deviation between the reference position and the position of the landmark 12 in the first image is most probably indicative of a shift of the camera 6 relative to its reference position, and therefore potential deharmonization between the camera 6 and the inertial unit 4.

The alert is signalled during the step 112 to a cockpit of the carrier 1 for example, so that a pilot on the carrier 1 can be informed of the failure of the hybridization device 2.

Also, in case of alert, the processing unit 8 ensures that inertial/video hybridization is executed from a velocity originating from the camera 6, in particular a velocity which would be calculated from the image in which a deviation greater than the threshold has been detected.

If on the contrary the deviation is not greater than the predetermined threshold, the processing unit 8 calculates an estimated velocity of the carrier 1 by means of the first image and the deviation (step 114).

More precisely, during step 114 the processing unit 8 marks at least one external landmark not fixed on the carrier in two images acquired at different instants by the camera 6: the first image and another acquired image before or after the first image by the camera 6. This external landmark occupies different positions in these two images when the carrier 1 is moving. The processing unit 8 first estimates the shift made by this external landmark between the two images. Next, the processing unit corrects this shift by means of the position deviation calculated previously in step 108. The corrected shift is then divided by the time period which separates the respective acquisitions of the two images so as to obtain the estimated velocity.

Next, the processing unit 8 executes hybridization between the inertial data acquired by the inertial unit 4 and the calculated velocity so as to produce a solution for navigation of the carrier 1 (step 116).

The processing unit 8 can also optionally determine a level of contrast in a zone showing the landmark 12 in the first acquired image. This level of contrast can be a contrast between different parts of the landmark 12 being viewed (for example, in the case of a landmark 12 of artificial sight type, the contrast between black zones and white zones of the sight or a contrast between the landmark 12 itself and its environment). In this case the processing unit 8 then calculates a deviation in contrast between the level of contrast determined in the relevant zone, and a level of reference contrast, and compares the deviation in contrast to a predetermined contrast threshold. An alert is signalled selectively when the deviation in contrast is greater than the predetermined contrast threshold. These additional steps detect conditions of visibility of the camera 6 resulting in obtaining an estimate of velocity too low to be injected into inertial/video hybridization. These steps can be performed before, during or after steps 104, 106, 108, 110.

The steps described earlier are repeated for several images acquired by the camera 6.

It is clear that using a single landmark is enough to detect deharmonization, and to a certain extent correct the estimated velocity by the processing unit. However, using several landmarks produces more effective correction of such a velocity.

During the method described above, a stored position which had been determined in a preliminary phase during which the harmonised character of the camera 6 and of the inertial unit 4 could be guaranteed has been used as reference position.

It should be noted however that a carrier 1 can be deformable, and therefore that some parts of such a carrier 1 are likely to shift relative to each other. This is the case especially of the wingtips of an aircraft, which can deform relative to the fuselage of this aircraft. In this way, it is possible that a landmark 12 can shift relative to the camera 6 without as such there being substantial deharmonization between the camera 6 and the inertial unit 4. The case of a camera 6 mounted on the fuselage, and turned to the side of the aircraft, in the direction of a wing, and a landmark 12 situated at the tip of this wing can be cited for example.

When the aircraft is travelling, the wing can flex slightly from bottom to top such that the position of the landmark 12 which will then be determined by the processing unit 8 will be variable. In such a situation, the preceding method could conclude with existence of deharmonization between the camera 6 and the inertial unit 2 on the basis of excessive deviation in position, while this is not the case.

Figure 3:
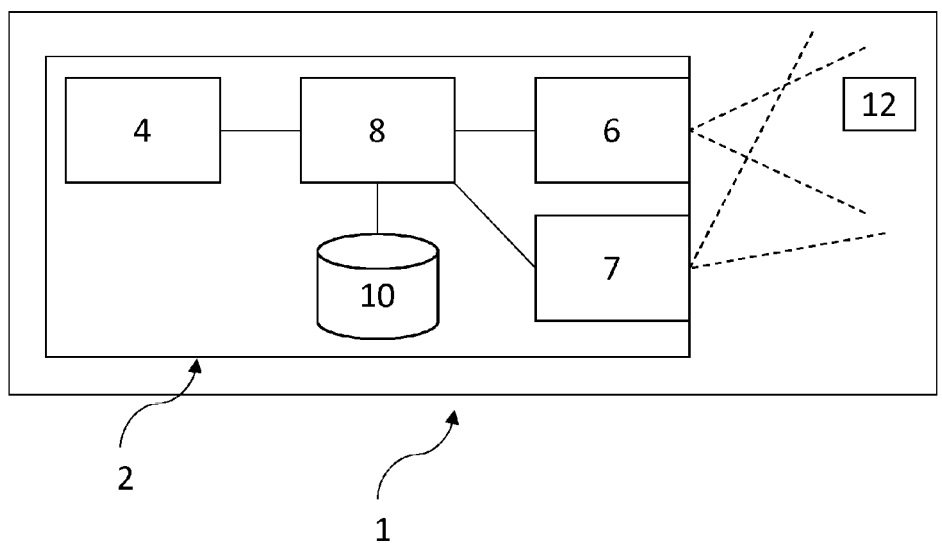
FIG. 3 FIG. 3 schematically illustrates a device for inertial/video hybridization according to a second embodiment of the invention, embedded on a carrier.

FIG. 3 illustrates a second embodiment of a hybridization device 2 for rectifying this issue of detecting false positives. The hybridization device 2 according to this second embodiment comprises a second camera 7 oriented to at least one landmark 12 déjà vu by the camera 6. This second camera 7 is used as source of reference position.

Each of the two cameras 6, 7 is harmonised with the inertial unit 4 during the preliminary calibration phase. Stored in the memory 10 is a transformation for passing from a reference attached to the second camera 7 to the reference attached to the first camera 6.

The method executed by the hybridization device 2 according to the second embodiment differs from the method described previously by the step for determination 106 of the reference position of the landmark 12, which is performed as follows.

The second camera 7 acquires at least one second image showing the landmark 12 also shown in the first acquired image by the first camera 6. However, in the second image the landmark 12 is seen from a different angle, and at a different distance.

The processing unit 8 applies step 104 to the second image, specifically recognises the landmark 12 in the second image and locates its position in the second image, conventionally called second position of the landmark 12.

The processing unit 8 then applies a change of frame to the second position so as to project this position in the plane seen by the first camera 6. The result of this change of frame is the reference position such as described previously, of which the deviation with the position of the landmark 12 in the first image is then compared to a threshold.

If by chance both cameras 6, 7 remain harmonised with the inertial unit 4, but the landmark 12 shifts relative to these two cameras 6, 7 due to deformation of the carrier 1, this deformation is compensated by calculation of the deviation during step 108, which will be theoretically nil. However, if one of the two cameras 6, 7 deharmonizes relative to the inertial unit 4, this deharmonization will be repeated in the calculated deviation in position, which will then be a higher value. Exceeding the threshold by this deviation will reveal deharmonization of one of the operating cameras 6, 7. Eventually, this second embodiment has the advantage of avoiding conveying a "false positive" caused by deformation of a part of the carrier 1.

The methods described above apply advantageously during a taxiing or landing phase of an aircraft for the reasons given at the outset.

The invention claimed is:

1. A device for inertial/video hybridization intended to be embedded on a carrier, the device comprising:
   a first camera configured to acquire a first image showing a landmark fixed on the carrier,
   a second camera configured to acquire a second image also showing the landmark,
   a processing unit configured to estimate a velocity of the carrier from the first image, in order to hybridize the estimated velocity with inertial data relative to the carrier produced by an inertial unit,
   wherein the processing unit is further configured to:
   locate a first position of the landmark in the first image, locate a second position of the landmark in the second image, determine a reference position of the landmark by applying to the second position a predetermined transformation representative of a change of frame from the second camera to the first camera, calculate a deviation between the first position and the reference position of the landmark, compare the calculated deviation with a predetermined threshold, signal an alert indicating a potential deharmonization between the first camera and the inertial unit when the calculated deviation is greater than the predetermined threshold.

2. The device according to claim 1, wherein the reference position of the landmark is a position of the landmark in a reference image acquired by the first camera while the inertial unit and the first camera are harmonized.

3. The device according to claim 1, wherein the processing unit is configured to not hybridize the inertial data by being based on the estimated velocity, when the deviation is greater than the predetermined threshold.

4. The device according to claim 1, wherein the processing unit is configured to estimate the velocity of the carrier by means of the calculated deviation so as to correct deharmonization of the first camera relative to the inertial unit when the calculated deviation is not greater than the predetermined threshold, and to hybridize the velocity with the inertial data so as to produce a solution for navigation of the carrier.

5. The device according to claim 1, wherein the processing unit is configured to:

determine a level of contrast in a zone showing the landmark in the first image, calculate a deviation in contrast between the level of contrast determined in the zone and a level of reference contrast, compare the deviation in contrast to a predetermined contrast threshold, signal an alert when the deviation in contrast is greater than the predetermined contrast threshold.

6. A carrier comprising a device for inertial/video hybridization according to claim 1, the landmark being fixed on the carrier.

7. An inertial/video hybridization method, the method comprising:

acquiring, by a first camera embedded on a carrier, a first image showing a landmark fixed on the carrier, acquiring, by a second camera embedded on the carrier, a second image also showing the landmark, estimating a velocity of the carrier from the first image, in order to hybridize the estimated velocity with inertial data relative to the carrier produced by an inertial unit, locating a first position of the landmark in the first image, locating a second position of the landmark in the second image, determining a reference position of the landmark by applying to the second position a predetermined transformation representative of a change of frame from the second camera to the first camera, calculating a deviation between the first position and the reference position of the landmark, comparing the deviation with a predetermined threshold, signalling an alert indicating a potential deharmonization between the first camera and the inertial unit when the calculated deviation is greater than the predetermined threshold.

8. The method according to the preceding claim 7, wherein the carrier is an aircraft.

9. The method according to the preceding claim 7, steps of which are performed when the aircraft is in taxiing or landing phase.

10. A device for inertial/video hybridization intended to be embedded on a carrier, the device comprising:

a camera configured to acquire an image showing a predetermined landmark fixed on the carrier, a processing unit configured to estimate a velocity of the carrier from the image, in order to hybridize the estimated velocity with inertial data relative to the carrier produced by an inertial unit, wherein the processing unit is further configured to:

locate a position of the landmark in the image, calculate a deviation between the located position and a reference position of the landmark, compare the calculated deviation with a predetermined threshold, signal an alert when the calculated deviation is greater than the predetermined threshold, determine a level of contrast in a zone showing the landmark in the image, calculate a deviation in contrast between the level of contrast determined in the zone and a level of reference contrast, compare the deviation in contrast to a predetermined contrast threshold, signal an alert indicating a potential deharmonization between the first camera and the inertial unit when the deviation in contrast is greater than the predetermined contrast threshold.

* * * * *